(12) United States Patent
Shen et al.

(10) Patent No.: US 12,098,639 B2
(45) Date of Patent: Sep. 24, 2024

(54) ATTITUDE SELF-CORRECTING UNDERGROUND TRANSPORTATION APPARATUS BASED ON UWB TECHNOLOGY AND CONTROL METHOD THEREOF

(71) Applicants: China University of Mining and Technology, Jiangsu (CN); ANHUI UNIVERSITY OF SCIENCE AND TECHNOLOGY, Anhui (CN)

(72) Inventors: Gang Shen, Jiangsu (CN); Zhencai Zhu, Jiangsu (CN); Song Qu, Jiangsu (CN); Yunjie Sa, Jiangsu (CN); Yu Tang, Jiangsu (CN); Xiang Li, Jiangsu (CN); Guan Yuan, Jiangsu (CN); Zhiou Xu, Jiangsu (CN); Jiaqi Zhao, Jiangsu (CN); Pengpeng Chen, Jiangsu (CN)

(73) Assignees: China University of Mining and Technology, Jiangsu (CN); ANHUI UNIVERSITY OF SCIENCE AND TECHNOLOGY, Anhui (CN)

(*) Notice: Subject to any disclaimer, the term of this patent is extended or adjusted under 35 U.S.C. 154(b) by 0 days.

(21) Appl. No.: 18/013,908

(22) PCT Filed: Aug. 31, 2022

(86) PCT No.: PCT/CN2022/116082
§ 371 (c)(1),
(2) Date: Dec. 30, 2022

(87) PCT Pub. No.: WO2023/030362
PCT Pub. Date: Mar. 9, 2023

(65) Prior Publication Data
US 2023/0349295 A1   Nov. 2, 2023

(30) Foreign Application Priority Data

Aug. 31, 2021  (CN) .......................... 202111008694.X

(51) Int. Cl.
*B60P 7/06* (2006.01)
*E21F 13/00* (2006.01)

(52) U.S. Cl.
CPC ................ *E21F 13/00* (2013.01); *B60P 7/06* (2013.01)

(58) Field of Classification Search
CPC .................................. E21F 13/00; B60P 7/06
See application file for complete search history.

(56) References Cited

U.S. PATENT DOCUMENTS

| 2002/0159855 A1* | 10/2002 | Ketchmark | ............. | E02F 3/968 |
| | | | | 410/31 |
| 2013/0211713 A1* | 8/2013 | Georgy | .................... | G01S 19/51 |
| | | | | 701/408 |

(Continued)

FOREIGN PATENT DOCUMENTS

| CN | 101451933 | 6/2009 |
| CN | 202970796 | 6/2013 |

(Continued)

OTHER PUBLICATIONS

"International Search Report (Form PCT/ISA/210) of PCT/CN2022/116082," mailed on Dec. 7, 2022, pp. 1-4.

(Continued)

*Primary Examiner* — Jess Whittington
(74) *Attorney, Agent, or Firm* — JCIPRNET

(57) ABSTRACT

The present application relates to an attitude self-correcting underground transportation apparatus based on UWB technology and a control method thereof. A transport clamping and fastening mechanism is mounted on an upper platform part of a six-degree-of-freedom motion platform. An attitude perception and sensing set at least includes three UWB tags being configured to acquire position information. A control module is electrically connected to the attitude perception and sensing set, the six-degree-of-freedom motion platform, (Continued)

and the transport clamping and fastening mechanism separately, and is configured to send an electric signal to drive the six-degree-of-freedom motion platform and the transport clamping and fastening mechanism to grip an object to be transported, collect positioning information of the attitude perception and sensing set, calculate the attitude of the six-degree-of-freedom motion platform in real time, and perform attitude adjustment with reference to an expected position and attitude to maintain a smooth transportation process.

8 Claims, 2 Drawing Sheets

(56) References Cited

U.S. PATENT DOCUMENTS

| | | | | |
|---|---|---|---|---|
| 2015/0168953 | A1* | 6/2015 | Smid | B62D 37/00 701/28 |
| 2016/0193729 | A1* | 7/2016 | Williams | G01C 21/3856 901/1 |
| 2019/0056422 | A1* | 2/2019 | Park | G01P 13/00 |
| 2020/0126239 | A1* | 4/2020 | Qian | G01S 3/7864 |
| 2021/0042482 | A1* | 2/2021 | McAllister | G06K 7/10346 |

FOREIGN PATENT DOCUMENTS

| | | |
|---|---|---|
| CN | 106275501 | 1/2017 |
| CN | 111045438 | 4/2020 |
| CN | 113766418 | 12/2021 |

OTHER PUBLICATIONS

"Written Opinion of the International Searching Authority (Form PCT/ISA/237) of PCT/ CN2022/116082," mailed on Dec. 7, 2022, pp. 1-4.

* cited by examiner

ATTITUDE SELF-CORRECTING UNDERGROUND TRANSPORTATION APPARATUS BASED ON UWB TECHNOLOGY AND CONTROL METHOD THEREOF

CROSS-REFERENCE TO RELATED APPLICATION

This application is a 371 of international application of PCT application serial no. PCT/CN2022/116082, filed on Aug. 31, 2022, which claims the priority benefit of China application no. 202111008694.X, filed on Aug. 31, 2021. The entirety of each of the above mentioned patent applications is hereby incorporated by reference herein and made a part of this specification.

TECHNICAL FIELD

The present application relates to the technical field of underground transportation, and in particular, to an attitude self-correcting underground transportation apparatus based on UWB technology and a control method thereof.

BACKGROUND

Coal is still the main pillar of energy in China at present. Coal mining is a matter of national security, and the main coal mining method at present is underground mining. However, with the large-scale mining and deep excavation of coal resources over the years, the mining conditions have gradually deteriorated, the mining difficulty has risen, and unsafe factors have increased. Therefore, underground unmanned or less-manpower operation has become a key target for smart mines. With the improvement of the intelligence level of the underground working face, the intelligence level of a large number of underground devices also is being improved. The conventional transportation ways of the underground devices are vulnerable to the route environment, leading to the damage or failure of the devices. Thus, underground smooth transportation of these devices has become one of the research hotspots at present.

To achieve smooth transportation of the underground devices, the primary problem to be solved is attitude perception and attitude correction control of a loading portion of a transport vehicle. However, the research base in these aspects is relatively weak. As regard for the attitude perception, the commonly used technical means at present include visual perception, strapdown inertial navigation perception, etc. However, the visual perception technology has high requirements on the application environment; and may fail because it is susceptible to high humidity and high dust in the coal mine shaft. The attitude perception precision of the strapdown inertial navigation perception technology is limited by sensing precision, but high-precision sensors are costly and unsuitable for mass applications. Moreover, strapdown inertial navigation sensors have an increased error in measurement data due to self-vibration of the transport vehicle, thus affecting the attitude perception precision and easily reducing the transportation smoothness of the underground devices.

SUMMARY

In view of this, for the foregoing technical problems, it is necessary to provide an attitude self-correcting underground transportation apparatus based on UWB technology and a control method thereof, which can improve the attitude perception precision of a loading portion of a transport vehicle.

An attitude self-correcting underground transportation apparatus based on UWB technology is provided, the underground transportation apparatus including: a six-degree-of-freedom motion platform, a transport clamping and fastening mechanism, an attitude perception and sensing set, and a control module, where
 the transport clamping and fastening mechanism is mounted on an upper surface of an upper platform part of the six-degree-of-freedom motion platform;
 the attitude perception and sensing set at least includes three UWB tags, the UWB tags in the attitude perception and sensing set being evenly distributed on the side of the upper platform part of the six-degree-of-freedom motion platform and being configured to acquire position information; and
 the control module is electrically connected to the attitude perception and sensing set, the six-degree-of-freedom motion platform, and the transport clamping and fastening mechanism separately, and is configured to send an electric signal to drive the six-degree-of-freedom motion platform and the transport clamping and fastening mechanism to grip an object to be transported, collect positioning information of the attitude perception and sensing set, calculate the attitude of the upper platform part of the six-degree-of-freedom motion platform in real time, and perform attitude adjustment with reference to an expected position and attitude to maintain a smooth transportation process.

In an embodiment, the transport clamping and fastening mechanism includes: a clamping component, a first holder set, a second holder set, and an explosion-proof servo motor set;
 the clamping component includes four ball screws of the same specifications, each ball screw having two ball nuts capable of relative motion and a gripping jaw being fixed on each ball nut; and the explosion-proof servo motor set includes four explosion-proof servo motors; the first holder set includes two first holding bases; and the second holder set includes two second holding bases;
 each explosion-proof servo motor is connected at one end of the corresponding ball screw via a coupler, the other ends of two of the ball screws are inserted into the corresponding first holding bases respectively, and the other ends of another two of the ball screws are inserted into the corresponding second holding bases respectively; two of the explosion-proof servo motors are fixed abreast at a first position on the upper surface of the upper platform part of the six-degree-of-freedom motion platform, and another two of the explosion-proof servo motors are fixed abreast at a second position on the upper surface of the upper platform part of the six-degree-of-freedom motion platform; and the first holding bases are fixed abreast at a third position on the upper surface of the upper platform part of the six-degree-of-freedom motion platform, and the second holding bases are fixed abreast at a fourth position on the upper surface of the upper platform part of the six-degree-of-freedom motion platform, the first, second, third, and fourth positions being selected in such a manner that the four ball screws are arranged in two rows and two columns to form a #-shaped pattern on the upper surface of the upper platform part of the six-degree-of-freedom motion platform.

In an embodiment, the six-degree-of-freedom motion platform includes a main support, an attitude drive mechanism, and an upper platform part; and an upper surface of the main support is movably connected to a tail end of the attitude drive mechanism, a movable top end of the attitude drive mechanism is connected to a lower surface of the upper platform part, and the transport clamping and fastening mechanism is mounted on the upper surface of the upper platform part.

In an embodiment, the main support is a hollow steel frame.

In an embodiment, the upper platform part is a solid platform.

In an embodiment, the attitude drive mechanism includes six explosion-proof servo-electric cylinders that are grouped into three sets of attitude drive components;

a tail end of each explosion-proof servo-electric cylinder in the three sets of attitude drive components is separately mounted at a corresponding mounting point on the upper surface of the main support via a universal ball hinge, in such a manner that a first equilateral triangle is formed by connecting the mounting points corresponding to the tail ends of the explosion-proof servo-electric cylinders in the three sets of attitude drive components;

a top end of each explosion-proof servo-electric cylinder in the three sets of attitude drive components is mounted at a corresponding mounting point on the lower surface of the upper platform part separately via a hinge, in such a manner that a second equilateral triangle is formed by connecting the mounting points corresponding to the top ends of the explosion-proof servo-electric cylinders in the three sets of attitude drive components; and a side length of the first equilateral triangle is greater than that of the second equilateral triangle.

In an embodiment, the tail ends of the two explosion-proof servo-electric cylinders in each set of attitude drive components are respectively mounted abreast at the corresponding mounting points via the universal ball hinge; and the top ends of the two explosion-proof servo-electric cylinders in each set of attitude drive components are respectively mounted abreast at the corresponding mounting points via the hinge.

In an embodiment, the control module is an embedded core controller based on an STM32 platform.

In an embodiment, the control module is arranged on the upper platform part of the six-degree-of-freedom motion platform.

A control method of an attitude self-correcting underground transportation apparatus based on UWB technology is provided, the method including the following steps:

according to a received start instruction, sending an opening electric signal to a transport clamping and fastening mechanism to cause gripping jaws of the transport clamping and fastening mechanism to be opened to the maximum degree;

sending a position adjustment electric signal to a six-degree-of-freedom motion platform to cause an upper platform part of the six-degree-of-freedom motion platform to be moved to a gripping position of an object to be transported;

when an instruction that the object to be transported has been placed is received, sending a clamping signal to the transport clamping and fastening mechanism to cause the gripping jaws of the transport clamping and fastening mechanism to firmly grip the object to be transported;

sending a wake-up signal to an attitude perception and sensing set to wake up each UWB tag of the attitude perception and sensing set;

collecting initial positioning information of the attitude perception and sensing set to perform attitude calculation, thus obtaining an initial spatial position and attitude of the upper platform part of the six-degree-of-freedom motion platform;

determining whether the initial spatial position and attitude meet a preset target position and attitude;

if the initial spatial position and attitude does not meet the preset target position and attitude, sending a position adjustment electric signal to cause the upper platform part of the six-degree-of-freedom motion platform to be adjusted to meet the preset target position and attitude;

setting a spatial position and attitude that meets the preset target position and attitude to an expected position and attitude;

upon receiving a transportation start instruction, collecting positioning information of the attitude perception and sensing set in real time, and performing calculation of a spatial position and attitude in real time according to the positioning information, to determine a current spatial position and attitude;

according to analysis of the expected position and attitude and the current spatial position and attitude, determining whether to perform attitude adjustment; and when attitude adjustment is required, calculating attitude adjustment parameters according to the expected position and attitude and the current spatial position and attitude; and sending a position adjustment electric signal according to the attitude adjustment parameters, to control adjustment of the upper platform part of the six-degree-of-freedom motion platform to the expected position and attitude.

In the foregoing attitude self-correcting underground transportation apparatus based on UWB technology and control method thereof, the transport clamping and fastening mechanism is mounted on an upper surface of the upper platform part of the six-degree-of-freedom motion platform; the attitude perception and sensing set at least includes three UWB tags, where the UWB tags in the attitude perception and sensing set are evenly distributed on the side of the upper platform part of the six-degree-of-freedom motion platform and are configured to acquire position information; the control module is electrically connected to the attitude perception and sensing set, the six-degree-of-freedom motion platform, and the transport clamping and fastening mechanism separately, and is configured to send an electric signal to drive the six-degree-of-freedom motion platform and the transport clamping and fastening mechanism to grip an object to be transported, collect positioning information of the attitude perception and sensing set, calculate the attitude of the upper platform part of the six-degree-of-freedom motion platform in real time, and perform attitude adjustment with reference to an expected position and attitude to maintain a smooth transportation process. With regard to the attitude self-perception, the present application abandons the high-cost conventional solutions that are susceptible to interference; and acquires the positioning information by resorting to the UWB positioning network system widely deployed in the mine shaft and by additionally arranging several UWB tags, and further performs real-time calculation, to obtain a real-time equivalent attitude of the object to be transported, thus effectively reducing the cost, improving the attitude perception precision, and meeting the requirement for smooth transportation of underground devices.

DETAILED DESCRIPTION OF THE EMBODIMENTS

Figure 1:
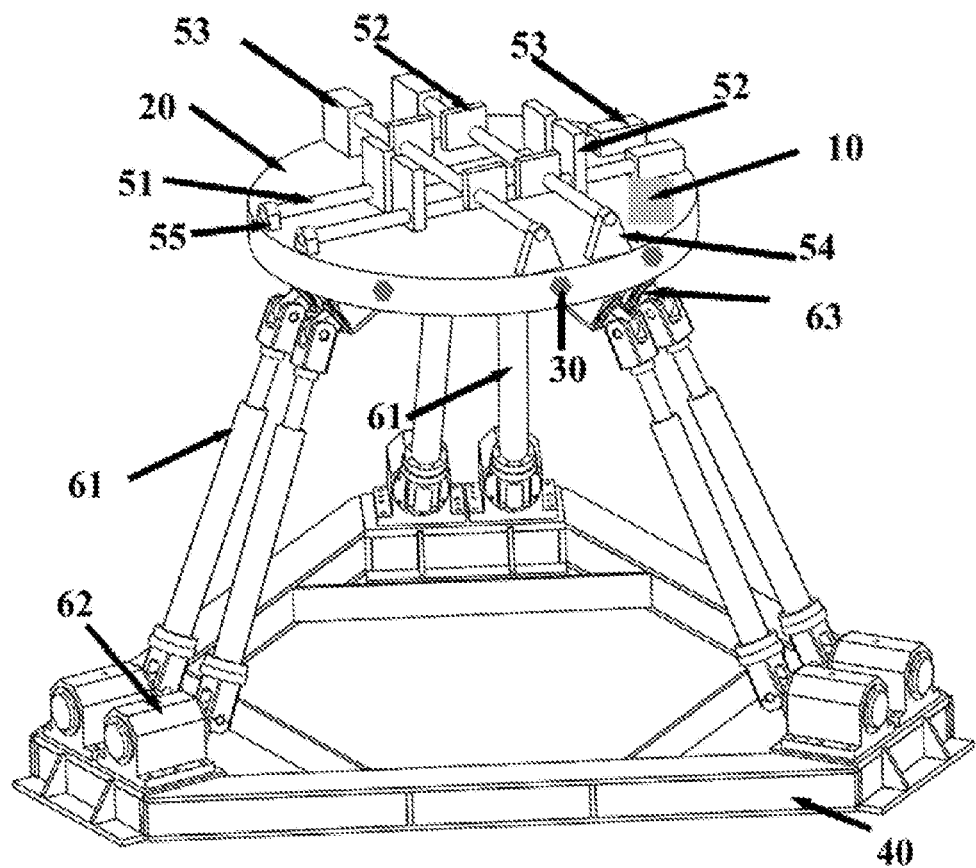
FIG. 1 illustrates a schematic structural diagram of an attitude self-correcting underground transportation apparatus based on UWB technology in an embodiment.

To make the objective, technical solutions, and advantages of the present application clearer, the present application is further described in detail below with reference to the accompanying drawings and embodiments. It should be understood that the specific embodiments described herein are only used to explain the present application, and are not intended to limit the present application.

In an embodiment, an attitude self-correcting underground transportation apparatus based on UWB technology includes a six-degree-of-freedom motion platform, a transport clamping and fastening mechanism, an attitude perception and sensing set, and a control module 10.

The transport clamping and fastening mechanism is mounted on an upper surface of an upper platform part 20 of the six-degree-of-freedom motion platform. The attitude perception and sensing set at least includes three UWB tags 30, where the UWB tags 30 in the attitude perception and sensing set are evenly distributed on the side of the upper platform part 20 of the six-degree-of-freedom motion platform and are configured to acquire position information. The control module 10 is electrically connected to the attitude perception and sensing set, the six-degree-of-freedom motion platform, and the transport clamping and fastening mechanism separately, and is configured to send an electric signal to drive the six-degree-of-freedom motion platform and the transport clamping and fastening mechanism to grip an object to be transported, collect positioning information of the attitude perception and sensing set, calculate the attitude of the upper platform part of the six-degree-of-freedom motion platform in real time, and perform attitude adjustment with reference to an expected position and attitude to maintain a smooth transportation process.

The UWB tags 30 each have a corresponding number to distinguish the positioning information of the UWB tags 30. The control module 10 may be a computer or an embedded core controller. The control module 10 is mainly configured to collect the positioning information of the UWB tags 30 and locally perform real arithmetic to calculate a own real-time position and attitude of the upper surface of the upper platform part 20 of the six-degree-of-freedom motion platform, compare the same with the expected position and attitude, calculate a drive signal and output the signal to an attitude drive mechanism for driving cooperation of the attitude drive mechanism to perform attitude correction. And also, the control module functions to drive the transport clamping and fastening mechanism. The control module 10 may be mounted on a vehicle body of an underground transport vehicle, on a main support 40 of a transport main body, on the upper platform part 20 of the six-degree-of-freedom motion platform, or the like. However, the mounting position of the control module is not limited thereto, and may be any position that can provide a mounting base for the control module 10. For convenience, the control module 10 is mounted on the upper platform part 20 of the six-degree-of-freedom motion platform of the transport main body.

As shown in FIG. 1, in an embodiment, the transport clamping and fastening mechanism includes: a clamping component, a first holder set, a second holder set, and an explosion-proof servo motor set. The clamping component includes four ball screws 51 of the same specifications, where each ball screw 51 has two ball nuts capable of relative motion and a gripping jaw 52 is fixed on each ball nut. The explosion-proof servo motor set includes four explosion-proof servo motors 53, the first holder set includes two first holding bases 54, and the second holder set includes two second holding bases 55.

Each explosion-proof servo motor 53 is connected at one end of the corresponding ball screw 51 via a coupler. The other ends of two of the ball screws 51 are inserted into the corresponding first holding bases 54 respectively, and the other ends of another two of the ball screws 51 are inserted into the corresponding second holding bases 55 respectively. Two of the explosion-proof servo motors 53 are fixed abreast at a first position on the upper surface of the upper platform part 20 of the six-degree-of-freedom motion platform, and another two of the explosion-proof servo motors 53 are fixed abreast at a second position on the upper surface of the upper platform part 20 of the six-degree-of-freedom motion platform. The first holding bases 54 are fixed abreast at a third position on the upper surface of the upper platform part 20 of the six-degree-of-freedom motion platform, and the second holding bases 55 are fixed abreast at a fourth position on the upper surface of the upper platform part 20 of the six-degree-of-freedom motion platform. The first, second, third, and fourth positions are selected in such a manner that the four ball screws are arranged in two rows and two columns to form a #-shaped pattern on the upper surface of the upper platform part 20 of the six-degree-of-freedom motion platform.

The transport clamping and fastening mechanism is mainly configured to clamp and fix an object to be transported that has any size and shape, and is mainly composed of a clamping component, a first holder set, a second holder set, and an explosion-proof servo motor set. All of the mechanical main bodies of the transport clamping and fastening mechanism are mounted on the upper platform part 20 of the six-degree-of-freedom motion platform. The four ball screws 51 collaborate with each other with independent and separate movements to drive two gripping jaws of the same ball screw to move synchronously towards or away from each other, thus implementing centering clamping and fixing of objects to be transported that have different sizes and shapes.

In an embodiment, the six-degree-of-freedom motion platform includes a main support 40, an attitude drive mechanism, and an upper platform part 20. An upper surface of the main support 40 is movably connected to a tail end of the attitude drive mechanism, a movable top end of the attitude drive mechanism is connected to a lower surface of the upper platform part 20, and the transport clamping and fastening mechanism is mounted on the upper surface of the upper platform part 20.

The main support 40 may be a support formed from a metal material, such as steel, iron, or other metal materials. A structural form of the main support 40 includes, but is not limited to, a triangle, a circle, and a square, provided that the lower surface of the main support 40 can be fixedly mounted on the vehicle body of the underground transport vehicle and the upper surface of the main support 40 can form an inscribed equilateral triangle. The main support 40 is mainly configured to provide a mounting and fixing base for the attitude drive mechanism, and also serves as an intermediate connection between the transportation apparatus and an underground transport vehicle such as an electric locomotive, a monorail crane or other carrying parts. For convenience, the main support may be a triangular structure.

In an embodiment, the main support 40 is a hollow steel frame.

In an embodiment, the upper platform part 20 is a solid platform.

A structural form of the upper platform part includes, but is not limited to, a triangle, a circle, and a square. The upper platform part is mainly configured to provide a mounting base for the transport clamping and fastening mechanism, and may be a triangular structure for convenience.

In an embodiment, the attitude drive mechanism includes six explosion-proof servo-electric cylinders 61 that are grouped into three sets of attitude drive components. A tail end of each explosion-proof servo-electric cylinder 61 in the three sets of attitude drive components is separately mounted at a corresponding mounting point on the upper surface of the main support 40 via a universal ball hinge 62, in such a manner that a first equilateral triangle is formed by connecting the mounting points corresponding to the tail ends of the explosion-proof servo-electric cylinders 61 in the three sets of attitude drive components. A top end of each explosion-proof servo-electric cylinder 61 in the three sets of attitude drive components is mounted at a corresponding mounting point on the lower surface of the upper platform part 20 separately via a hinge 63, in such a manner that a second equilateral triangle is formed by connecting the mounting points corresponding to the top ends of the explosion-proof servo-electric cylinders 61 in the three sets of attitude drive components. A side length of the first equilateral triangle is greater than that of the second equilateral triangle.

In an embodiment, the tail ends of the two explosion-proof servo-electric cylinders 61 in each set of attitude drive components are respectively mounted abreast at the corresponding mounting points via the universal ball hinge 62; and the top ends of the two explosion-proof servo-electric cylinders 61 in each set of attitude drive components are respectively mounted abreast at the corresponding mounting points via the hinge 63.

The six-degree-of-freedom motion platform makes a six-degree-of-freedom motion by collaborative operation of the six explosion-proof servo-electric cylinders 61, to realize attitude maintenance and self-correction, thereby improving the smoothness of the transportation process.

In an embodiment, the control module 10 is an embedded core controller based on an STM32 platform.

The core functions of the embedded core controller include a transport clamping and fastening mechanism drive module, a six-degree-of-freedom motion platform drive module, a UWB tag wake-up/signal transmission module, and other auxiliary functional modules. The transport clamping and fastening mechanism drive module achieves a wired connection to each explosion-proof servo motor of the transport clamping and fastening mechanism by means of a universal serial interface, and drives the same by transmitting a voltage signal of 0 V to 10 V. The six-degree-of-freedom motion platform drive module achieves a wired connection to each explosion-proof servo-electric cylinder by means of a universal serial interface, and drives the same by transmitting a voltage signal of −10 V to 10 V. The UWB tag wake-up/signal transmission module is in a wired connection with each UWB tag by means of a universal serial interface, and performs signal transmission based on RS485 protocol. Specifically, the UWB tag wake-up/signal transmission module sends a high-level rising edge signal to wake up the UWB tags and a low-level falling edge signal to sleep the UWB tags, and encodes the positioning information of the UWB tags in a hexadecimal format and then transmits the encoded information.

In an embodiment, the control module 10 is arranged on the upper platform part of the six-degree-of-freedom motion platform.

In the foregoing attitude self-correcting underground transportation apparatus based on UWB technology, the transport clamping and fastening mechanism is mounted on an upper surface of the upper platform part of the six-degree-of-freedom motion platform; the attitude perception and sensing set at least includes three UWB tags, where the UWB tags in the attitude perception and sensing set are evenly distributed on the side of the upper platform part of the six-degree-of-freedom motion platform and are configured to acquire position information; the control module is electrically connected to the attitude perception and sensing set, the six-degree-of-freedom motion platform, and the transport clamping and fastening mechanism separately, and is configured to send an electric signal to drive the six-degree-of-freedom motion platform and the transport clamping and fastening mechanism to grip an object to be transported, collect positioning information of the attitude perception and sensing set, calculate the attitude of the six-degree-of-freedom motion platform in real time, and perform attitude adjustment with reference to an expected position and attitude to maintain a smooth transportation process. With regard to the attitude self-perception, the present application abandons the high-cost conventional solutions that are susceptible to interference; and acquires the positioning information by resorting to the UWB positioning network system widely deployed in the mine shaft and by additionally arranging several UWB tags, and further performs real-time calculation, to obtain a real-time equivalent attitude of the object to be transported, thus effectively reducing the cost, improving the attitude perception precision, and meeting the requirement for smooth transportation of underground devices.

Figure 2:
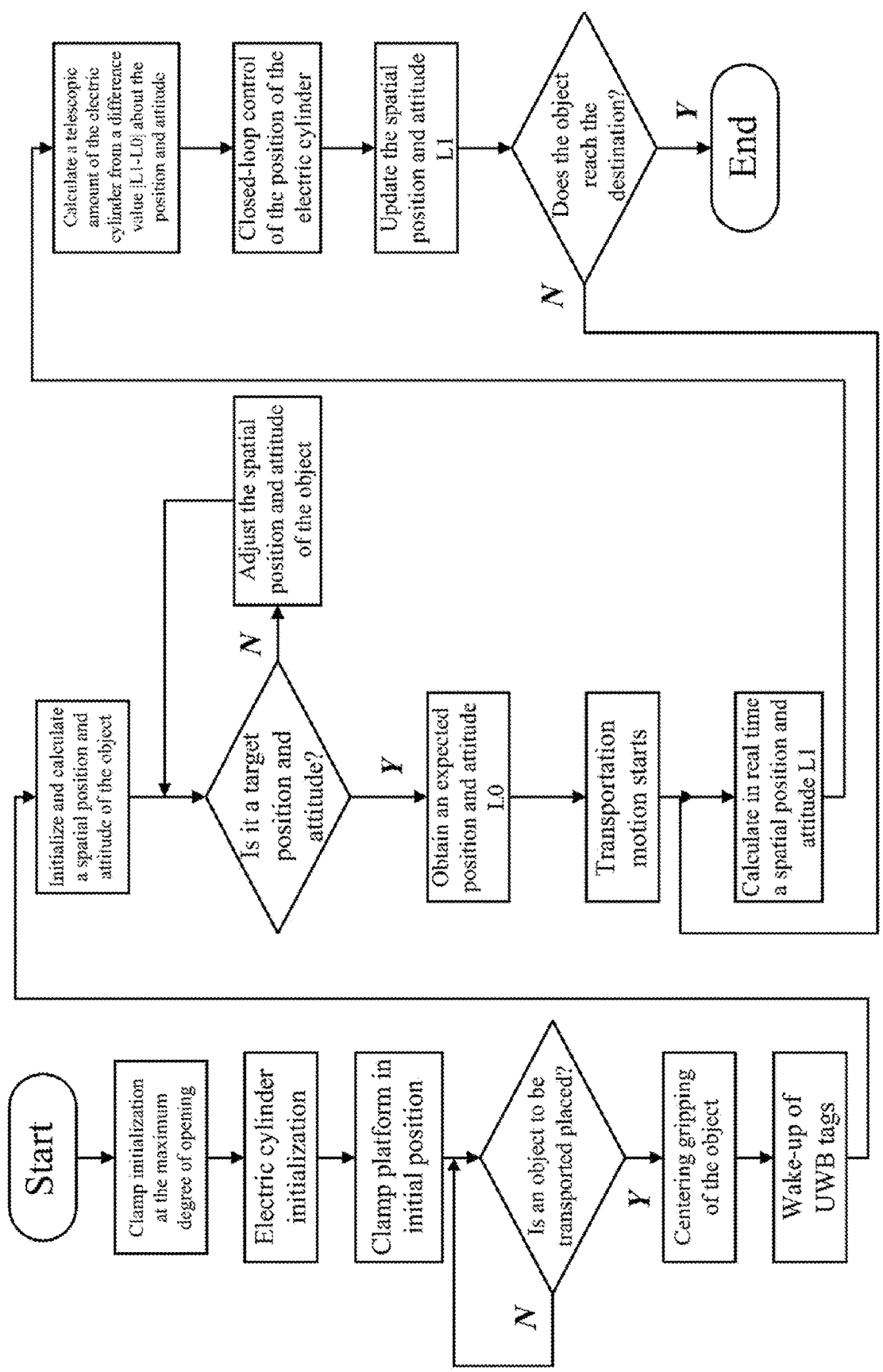
FIG. 2 illustrates a schematic flowchart of a control method of an attitude self-correcting underground transportation apparatus based on UWB technology in an embodiment.

In an embodiment, as shown in FIG. 2, a control method of an attitude self-correcting underground transportation apparatus based on UWB technology includes the following steps:

According to a received start instruction, an opening electric signal is sent to a transport clamping and fastening mechanism to cause gripping jaws of the transport clamping and fastening mechanism to be opened to the maximum degree. A position adjustment electric signal is sent to a six-degree-of-freedom motion platform to cause an upper platform part of the six-degree-of-freedom motion platform to be moved to a gripping position of an object to be transported. When an instruction that the object to be transported has been placed is received, a clamping signal is sent to the transport clamping and fastening mechanism to cause the gripping jaws of the transport clamping and fastening mechanism to firmly grip the object to be transported. A wake-up signal is sent to an attitude perception and sensing set to wake up each UWB tag of the attitude perception and sensing set. Initial positioning information of the attitude perception and sensing set is collected to perform attitude calculation, thus obtaining an initial spatial position and attitude of the upper platform part of the six-degree-of-freedom motion platform. It is determined whether the initial spatial position and attitude meet a preset target position and attitude. If the initial spatial position and attitude does not meet the preset target position and attitude, a position adjustment electric signal is sent to cause the upper platform part of the six-degree-of-freedom motion platform to be adjusted to meet the preset target position and attitude. A spatial position and attitude that meets the preset target position and attitude are set to an expected position and attitude. Upon receiving a transportation start instruction, positioning information of the attitude perception and sensing set is collected in real time, and calculation of a spatial position and attitude is performed in real time according to the positioning information, to determine a current spatial position and attitude. According to analysis of the expected position and attitude and the current spatial position and attitude, it is determined whether to perform attitude adjustment. When attitude adjustment is required, attitude adjustment parameters are calculated according to the expected position and attitude and the current spatial position and attitude; and a position adjustment electric signal is sent according to the attitude adjustment parameters, to control adjustment of the upper platform part of the six-degree-of-freedom motion platform to the expected position and attitude.

Specifically, as shown in FIG. 2, at the beginning of the operation, driven by a 0 V to 10 V voltage signal (namely, the opening electric signal) output from a transport clamping and fastening mechanism drive module of an embedded core controller, four explosion-proof servo motors of the transport clamping and fastening mechanism move in opposite directions, to drive ball screws to rotate. Then, the eight gripping jaws are driven to move away from each other in pairs, such that a clamping portion is opened to the maximum degree to easily grip the object.

Afterwards, driven by a −10 V to 10 V voltage signal (namely, the position adjustment electric signal) output from a six-degree-of-freedom motion platform drive module of the embedded core controller, six explosion-proof servo-electric cylinders of the six-degree-of-freedom motion platform move together, such that a clamp mounting platform reaches a designated position (namely, the gripping position of the object to be transported) to wait for placement of the object.

After the placement of the object, driven by a 0 V to 10 V voltage signal (namely, the clamping signal) output from the transport clamping and fastening mechanism drive module of the embedded core controller, the four explosion-proof servo motors move in forward directions, to drive the ball screws to rotate. Then, the eight gripping jaws are driven to move towards each other, thus implementing centering clamping of the object.

After the object is firmly gripped and fixed, a UWB tag wake-up/signal transmission module of the embedded core controller sends a high-level rising edge signal (namely, the wake-up signal) to wake up UWB positioning tags from a sleeping mode. Afterwards, communication is established with a UWB positioning base station that has been deployed in the underground roadway, to obtain spatial coordinate information (namely, the initial positioning information) corresponding to each tag. Then, the spatial coordinate information is encoded in a hexadecimal format and is transmitted back to the embedded core controller.

The embedded core controller performs a fast local operation after obtaining the spatial coordinate information, to obtain a spatial position and attitude of the upper platform part of the six-degree-of-freedom motion platform with respect to the geodetic coordinate system, where the position and attitude is equivalently regarded as a spatial position and attitude of the clamped object.

Subsequently, by comparison with a local database by the embedded core controller, or by a manual operation by a worker, the spatial position and attitude of the object to be transported with respect to the geodetic coordinate system are initialized, where the initialized position and attitude are the expected position and attitude L0 in the subsequent movement process.

After completion of the initialization, the underground transport vehicle starts moving, and during the movement, the UWB positioning tags communicate in real time with the UWB positioning base stations that have been deployed in the underground roadway throughout the operating process of the underground transport vehicle. Further, the real-time spatial coordinates of each tag are transmitted back to the embedded core controller to perform real-time calculation, thus obtaining a real-time equivalent spatial position and attitude L1 (namely, the current spatial position and attitude) of the object to be transported with respect to the geodetic coordinate system.

Afterwards, a built-in control program in the embedded core controller compares L1 and L0, and finds a positional deviation. By calculation from the coordinates, the positional deviation is decomposed into respective telescopic amounts (namely, the attitude adjustment parameters) corresponding to the explosion-proof servo-electric cylinders, and closed-loop control of displacements is performed, thus ensuring that the object to be transported is in the expected spatial position and attitude in real time, and guaranteeing smooth and steady transportation of the object.

It should be noted that, although the steps in the flowchart of FIG. 1 are shown sequentially as indicated by the arrows, these steps are not necessarily performed in the order indicated by the arrows. Unless otherwise specified herein, the execution of these steps is not strictly limited in order, and these steps can be executed in other orders. Moreover, at least some of the steps in FIG. 1 may include multiple sub-steps or multiple stages, and these sub-steps or stages are not necessarily performed at the same time, but may be performed at different times. The execution order of these sub-steps or stages is not necessarily performed sequentially, but may be performed in turn or alternately with at least some of other steps or sub-steps or stages of other steps.

The technical features of the above embodiments can be combined arbitrarily. For simplicity of description, all possible combinations of the various technical features of the above embodiments are not described. However, as long as there is no contradiction in the combinations of these technical features, they should be considered as falling within the description scope of this specification.

The above embodiments only represent several implementation modes of the present application, and the description thereof is relatively specific and detailed, but should not therefore be construed as limiting the scope of the present invention. It should be noted that for those of ordinary skill in the art, several modifications and improvements can be made without departing from the concept of the present application, and these modifications and improvements all belong to the protection scope of the present application. Therefore, the scope of protection of the present application shall be subject to the appended claims.

What is claimed is:

1. An attitude self-correcting underground transportation apparatus based on ultra-wide band (UWB) technology, comprising: a six-degree-of-freedom motion platform, a transport clamping and fastening mechanism, an attitude perception and sensing device, and a control module, wherein
the transport clamping and fastening mechanism is mounted on an upper surface of an upper platform part of the six-degree-of-freedom motion platform;
the attitude perception and sensing device at least includes three UWB tags, the UWB tags in the attitude perception and sensing device being distributed on a circumferential side of the upper platform part of the six-degree-of-freedom motion platform at equal distance and being configured to acquire position information; and
the control module is electrically connected to the attitude perception and sensing device, the six-degree-of-freedom motion platform, and the transport clamping and fastening mechanism separately, and is configured to send an electric signal to drive the six-degree-of-freedom motion platform and the transport clamping and fastening mechanism to grip an object to be transported, collect positioning information of the attitude perception and sensing device, calculate the attitude of the upper platform part of the six-degree-of-freedom motion platform in real time, and perform attitude adjustment with reference to an expected position and attitude to maintain a smooth transportation process;
wherein the transport clamping and fastening mechanism comprises a clamping component, a first holder set, a second holder set, and an explosion-proof servo motor set;
the clamping component comprises four ball screws of same specifications, each of the ball screws having two ball nuts capable of relative motion and a gripping jaw being fixed on each of the ball nuts; and the explosion-proof servo motor set comprises four explosion-proof servo motors; the first holder set comprises two first holding bases; and the second holder set comprises two second holding bases;
each of the explosion-proof servo motors is connected at one end of the corresponding ball screw via a coupler, another ends of two of the ball screws are inserted into the first holding bases, which are corresponding, respectively, and another ends of another two of the ball screws are inserted into the second holding bases, which are corresponding, respectively; two of the explosion-proof servo motors are fixed abreast at a first position on the upper surface of the upper platform part of the six-degree-of-freedom motion platform, and another two of the explosion-proof servo motors are fixed abreast at a second position on the upper surface of the upper platform part of the six-degree-of-freedom motion platform; and the first holding bases are fixed abreast at a third position on the upper surface of the upper platform part of the six-degree-of-freedom motion platform, and the second holding bases are fixed abreast at a fourth position on the upper surface of the upper platform part of the six-degree-of-freedom motion platform, the first, second, third, and fourth positions being selected in such a manner that the four ball screws are arranged in two rows and two columns to form a #-shaped pattern on the upper surface of the upper platform part of the six-degree-of-freedom motion platform.

2. The apparatus according to claim 1, wherein the six-degree-of-freedom motion platform comprises a main support, an attitude drive mechanism, and the upper platform part; and
an upper surface of the main support is movably connected to a tail end of the attitude drive mechanism, a movable top end of the attitude drive mechanism is connected to a lower surface of the upper platform part, and the transport clamping and fastening mechanism is mounted on the upper surface of the upper platform part.

3. The apparatus according to claim 2, wherein the main support is a hollow steel frame.

4. The apparatus according to claim 2, wherein the upper platform part is a solid platform.

5. The apparatus according to claim 2, wherein the attitude drive mechanism comprises six explosion-proof servo-electric cylinders that are grouped into three sets of attitude drive components;
a tail end of each of the explosion-proof servo-electric cylinders in the three sets of attitude drive components is separately mounted at one of mounting points corresponding to the upper surface of the main support via a universal ball hinge, in such a manner that a first equilateral triangle is formed by connecting the mounting points corresponding to the tail ends of the explosion-proof servo-electric cylinders in the three sets of attitude drive components;
a top end of each of the explosion-proof servo-electric cylinders in the three sets of attitude drive components is separately mounted at one of mounting points corresponding to the lower surface of the upper platform part separately via a hinge, in such a manner that a second equilateral triangle is formed by connecting the mounting points corresponding to the top ends of the explosion-proof servo-electric cylinders in the three sets of attitude drive components; and
a side length of the first equilateral triangle is greater than that of the second equilateral triangle.

6. The apparatus according to claim 5, wherein the tail ends of the two explosion-proof servo-electric cylinders in each of sets of the attitude drive components are respectively mounted abreast at the mounting points via the universal ball hinge; and the top ends of the two explosion-proof servo-electric cylinders in each of sets of the attitude drive components are respectively mounted abreast at the mounting points via the hinge.

7. The apparatus according to claim 1, wherein the control module is an embedded core controller based on an STM32 platform.

8. The apparatus according to claim 1, wherein the control module is arranged on the upper platform part of the six-degree-of-freedom motion platform.

* * * * *